United States Patent
Araki et al.

(10) Patent No.: US 6,645,555 B1
(45) Date of Patent: *Nov. 11, 2003

(54) MATERIAL FOR FLUORINE-CONTAINING COATING COMPOSITION AND METHOD FOR COATING BY USING SAME

(75) Inventors: Takayuki Araki, Settsu (JP); Hisato Sanemasa, Settsu (JP); Masahiro Kumegawa, Settsu (JP); Noritoshi Oka, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,360

(22) Filed: Jan. 3, 2000

Related U.S. Application Data

(62) Division of application No. 09/077,939, filed on Jun. 5, 1995, now Pat. No. 6,069,215.

(30) Foreign Application Priority Data

Dec. 8, 1995 (JP) ............................... 7-320572

(51) Int. Cl.⁷ ................................. B05D 1/36
(52) U.S. Cl. ................. 427/195; 427/388.4; 427/389.7; 427/407.2; 427/409; 526/245; 526/247
(58) Field of Search .............. 427/195, 388.4, 427/389.7, 407.2, 409; 526/245, 247

(56) References Cited

U.S. PATENT DOCUMENTS

| | | | | |
|---|---|---|---|---|
| 4,015,057 A | * | 3/1977 | Gall | 524/302 |
| 5,059,720 A | | 10/1991 | Hung | 568/674 |
| 5,304,617 A | | 4/1994 | Kodama et al. | 526/255 |
| 5,374,683 A | | 12/1994 | Morgan | 525/200 |
| 5,380,644 A | * | 1/1995 | Yonkoski et al. | |
| 5,629,372 A | * | 5/1997 | Anton et al. | |
| 5,670,593 A | | 9/1997 | Araki et al. | |
| 5,750,626 A | | 5/1998 | Shimizu et al. | |
| 5,869,574 A | | 2/1999 | Shimizu et al. | |
| 5,986,150 A | | 11/1999 | Araki et al. | |
| 6,054,537 A | | 4/2000 | Shimizu et al. | |
| 6,225,399 B1 | | 5/2001 | Araki et al. | |

FOREIGN PATENT DOCUMENTS

| | | |
|---|---|---|
| EP | 0 135 917 A2 | 4/1985 |
| EP | 0 728 776 A1 | 8/1996 |
| FR | 2 465 753 | 3/1981 |
| JP | 3-17109 A | 1/1991 |
| JP | 3-37252 A | 2/1991 |

(List continued on next page.)

OTHER PUBLICATIONS

Database WPI Week 8645, Derwent Publication Ltd., AN 86–295768, XP–002090157, Abstract of Japanese Patent No. 61–218611 A, Publication Date:Sep. 29, 1986.

(List continued on next page.)

*Primary Examiner*—Erma Cameron
(74) *Attorney, Agent, or Firm*—Kubovcik & Kubovcik

(57) ABSTRACT

To provide a fluorine-containing coating material which gives excellent adhesive strength directly to a substrate such as metal, glass, etc. with maintaining excellent characteristics of the fluorine-containing polymer such as thermal resistance, chemical resistance, non-sticking property and low friction property, and a method for coating the material. The fluorine-containing coating material is prepared by using a fluorine-containing ethylenic polymer having functional group which is obtained by copolymerizing (a-1) 0.05 to 30% by mole of at least one of fluorine-containing ethylenic monomers having any one of functional groups selected from hydroxyl, carboxyl, carboxylate salt group, carboxylate ester group or epoxy and (b-1) 70 to 99.95% by mole of at least one of fluorine-containing ethylenic monomers having no functional group mentioned above.

8 Claims, 1 Drawing Sheet

FOREIGN PATENT DOCUMENTS

| | | | |
|---|---|---|---|
| JP | 4-189880 A | | 7/1992 |
| JP | 5-1118 A | | 1/1993 |
| JP | 5-194668 A | | 8/1993 |
| JP | 5-247304 | | 9/1993 |
| JP | 08-302287 | * | 11/1996 |
| JP | 09-242983 | * | 9/1997 |
| WO | WO 95/33782 | | 12/1995 |

OTHER PUBLICATIONS

Database WPI, Derwent Publication Ltd., AN 127:251641 CA, Abstract of Japanese Patent No. 9–242983 A2, Publication Date:Sep. 16, 1997.

Database WPI, Derwent Publication Ltd., AN 126:105245 CA, Abstract of Japanese Patent No. 8–302287 A2, Publication Date:Nov. 19, 1996.

United States Patent Application No. 09/540,759, filed Mar. 31, 2000 (claims only).

United States Patent Application No. 09/797,693, filed Mar. 5, 2001 (claims only).

United States Patent Application No. 09/077,941, filed Jun. 5, 1998 (claims only).

United States Patent Application No. 09/380,499, filed Sep. 3, 1999 (claims only).

United States Patent Application No. 09/402,982, filed Oct. 14, 1999 (claims only).

United States Patent Application No. 09/423,045, filed Nov. 1, 1999 (claims only).

United States Patent Application No. 09/423,895, filed Nov. 16, 1999 (claims only).

United States Patent Application No. 09/424,084, filed Nov. 19, 1999 (claims only).

United States Patent Application No. 09/425,000, filed Dec. 3, 1999 (claims only).

United States Patent Application No. 09/763,412, filed Feb. 22, 2001 (claims only).

United States Patent Application No. 09/856,066, filed May 17, 2001 (claims only).

* cited by examiner

MATERIAL FOR FLUORINE-CONTAINING COATING COMPOSITION AND METHOD FOR COATING BY USING SAME

This application is a division of application Ser. No. 09/077,939, filed Jun. 5, 1998, and now U.S. Pat. No. 6,069,215, which is the U.S. National Stage of PCT/JP96/03575, filed Dec. 5, 1996.--

TECHNICAL FIELD

The present invention relates to a material for a fluorine-containing coating composition, a primer for a fluorine-containing coating composition, an aqueous dispersion for a fluorine-containing coating composition, a fluorine-containing powder coating composition and a resin composition for a fluorine-containing coating composition which can be firmly adhered to substrates such as metal, glass, etc. when coating the substrate with a fluorine-containing polymer, and a method for coating a surface of a substrate with a fluorine-containing polymer by using the primer for a fluorine-containing coating composition.

BACKGROUND ART

A a fluorine-containing polymer has been preferably used as a coating material applied to a surface of metal because of its excellent characteristics such as chemical resistance, thermal resistance and non-sticking property, and is used, for example, for lining of chemical apparatuses requiring corrosion resistance, inner lining of cooking apparatuses such as a rice cooker requiring corrosion resistance and non-sticking property, and other applications. However since its adhesion to a surface of metal is not sufficient due to its excellent non-sticking property, hitherto various modifications have been made to improve adhesion to the surface of metal.

One of them is a method for adhering a fluorine-containing polymer to a substrate by roughening the surface of metal chemically or physically with expecting an "anchor effect" therebetween. In this method, the surface roughening itself requires much labor, and though initial adhesion is possible, lowering of the anchor effect arises at the time of temperature change and at high temperature.

Also a method for chemically activating a surface of a fluorine-containing resin by treating the surface with a solution prepared by dissolving metallic sodium in liquid ammonia has been proposed. However in this method, not only there was a fear that the solution itself causes environmental pollution but also there was a problem that its handling is attended with danger. Further, there have been proposed methods for carrying out physical and chemical treatment such as plasma sputtering on a surface of a fluorine-containing resin or mechanically roughening the surface of a fluorine-containing resin. However these methods have problems such that the mentioned treatments require much labor, increase in cost arises and design or appearance of a coated surface is injured.

Also in order to improve adhesion of a fluorine-containing coating, investigations with respect to addition of various components and use of a primer have been made.

For example, there is a technique of adding an inorganic acid such as chromic acid to a coating composition containing a fluorine-containing polymer to form a chemical conversion coating film on a surface of metal for enhancing adhesion of the composition (JP-B-63-2675). However since chromic acid contains hexahydric chromium, it can be said that such a technique is not sufficient in view of safety in food and coating work. Further in case of use of other inorganic acids such as phosphoric acid, there was a problem such that safety of a fluorine-containing resin coating composition is damaged.

Use of a coating composition containing a fluorine-containing resin as a primer, in which heat resistant resins such as polyamideimide, polyimide, polyethersulfone and PEEK and in addition, a metal powder are added instead of the above-mentioned inorganic acid, has been studied (JP-A-6-264000). Inherently there is no compatibility between a fluorine-containing polymer and heat resistant resin. Therefore there arises a phase separation in a coating film, thus easily causing intercoat adhesion failure between the primer and the top coat. Further, film defects such as pin holes and cracks arise easily at the time of processing at high temperature and during use due to difference in heat shrinkage between the fluorine-containing resin and the heat resistant resin or due to lowering of elongation of the coating film by the addition of the heat resistant resin. Also since these heat resistant resins are colored brown by baking, it is difficult to use them for applications requiring white and vivid colors and transparency.

Further, non-sticking property and low friction property which the fluorine-containing resin inherently possesses are lowered.

Also for adhesion of a fluorine-containing resin coating composition to a glass requiring transparency, improvements of the adhesion have been tried by treating the substrate with a silane coupling agent or adding a silicone resin to the fluorine-containing resin coating composition (JP-B-54-42366, JP-A-5-177768, etc.). However thermal resistance and adhesion are insufficient, and separation of film, foaming and coloring arise easily at high temperature.

On the contrary, fluorine-containing coating compositions prepared by copolymerizing a hydrocarbon monomer containing a functional group such as hydroxyl or carboxyl have been discussed. However those coating compositions were originally studied mainly for a purpose of weather resistance, and therefore it is difficult to use them for applications requiring thermal resistance at 200° to 350° C. which is directed by the present invention, and for applications requiring non-sticking property, low friction property, etc.

Namely with respect to a polymer prepared by copolymerizing a hydrocarbon monomer (containing no fluorine) having a functional group, thermal decomposition easily occurs on components of the monomer at the time of processing at high temperature or during use, and thus coating film failure, coloring, foaming, separation, etc. arise, which makes it impossible to attain purposes of coating a fluorine-containing resin.

An object of the present invention is to solve the above-mentioned problems, and to provide a material for fluorine-containing coating composition which maintains excellent characteristics such as thermal resistance, chemical resistance, non-sticking property and low friction property of fluorine-containing polymer and further can have strong adhesion directly to a substrate such as metal, glass, etc., and to provide a method for coating by using the material for coating compositions.

DISCLOSURE OF THE INVENTION

The present invention relates to a material for a fluorine-containing coating composition which comprises a fluorine-containing ethylenic polymer having a functional group and prepared by copolymerizing:

(a-1) 0.05 to 30% by mole of at least one of fluorine-containing ethylenic monomers having any one of functional groups selected from hydroxyl, carboxyl, carboxylate salt group, carboxylate ester group or epoxy and (b-1) 70 to 99.95% by mole of at least one of fluorine-containing ethylenic monomers which do not have the functional group mentioned above.

Further the present invention relates to a primer for a fluorine-containing coating composition which comprises a fluorine-containing ethylenic polymer having a functional group and prepared by copolymerizing:

(a-2) 0.05 to 30% by mole of at least one of fluorine-containing ethylenic monomers having any one of functional groups selected from hydroxyl, carboxyl, carboxylate salt group, carboxylate ester group or epoxy and (b-2) 70 to 99.95% by mole of at least one of fluorine-containing ethylenic monomers which do not have the functional group mentioned above.

Further the present invention relates to an aqueous dispersion for a fluorine-containing coating composition which comprises a fluorine-containing ethylenic polymer having a functional group and prepared by copolymerizing:

(a-3) 0.05 to 30% by mole of at least one of fluorine-containing ethylenic monomers having any one of functional groups selected from hydroxyl, carboxyl, carboxylate salt group, carboxylate ester group or epoxy and (b-3) 70 to 99.95% by mole of at least one of fluorine-containing ethylenic monomers which do not have the functional group mentioned above.

Further the present invention relates to a fluorine-containing powder coating composition which comprises a fluorine-containing ethylenic polymer having functional group and prepared by copolymerizing:

(a-4) 0.05 to 30% by mole of at least one of fluorine-containing ethylenic monomers having any one of functional group selected from hydroxyl, carboxyl, carboxylate salt group, carboxylate ester groups or epoxy and (b-4) 70 to 99.95% by mole of at least one of fluorine-containing ethylenic monomers which do not have the functional group mentioned above.

In the present invention, it is preferable that the above-mentioned fluorine-containing ethylenic monomer (a-1) having functional a group is a fluorine-containing ethylenic monomer having a hydroxyl group.

It is also preferable in the present invention that the above-mentioned fluorine-containing ethylenic monomer (a-1) having a functional group is at least one of monomers represented by the formula (1):

$$CX_2=CX^1-R_f-Y \tag{1}$$

wherein Y is $-CH_2OH$, $-COOH$, carboxylate salt group, carboxylate ester group or epoxy, X and $X^1$ are the same or different and each is hydrogen atom or fluorine atom, $R_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having an ether bond and 1 to 40 carbon atoms.

It is also preferable in the present invention that in the above-mentioned formula (1), Y is $-CH_2OH$.

It is further preferable in the present invention that the above-mentioned fluorine-containing ethylenic monomer (a-1) having a functional group is a fluorine-containing monomer represented by the formula (2):

$$CH_2=CFCF_2-R_f^1-Y^1 \tag{2}$$

wherein $Y^1$ is $-CH_2OH$, $-COOH$, carboxylate salt group, carboxylate ester group or epoxy, $R_f^1$ is a divalent fluorine-containing alkylene group having 1 to 39 carbon atoms or $-OR_f^2$, in which $R_f^2$ is a divalent fluorine-containing alkylene group having 1 to 39 carbon atoms or a divalent fluorine-containing alkylene group having a ether bond and 1 to 39 carbon atoms.

It is preferable in the present invention that the fluorine-containing ethylenic monomer (b-1) having no functional group mentioned above is tetrafluoroethylene.

It is preferable in the present invention that the fluorine-containing ethylenic monomer (b-1) having no functional group mentioned above is a monomer mixture of 85 to 99.7% by mole of tetrafluoroethylene and 0.3 to 15% by mole of a monomer represented by the formula (3):

$$CF_2=CF-R_f^3 \tag{3}$$

wherein $R_f^3$ is $-CF_3$ or $OR_f^4$, in which $R_f^4$ is a perfluoroalkyl group having 1 to 5 carbon atoms.

It is preferable in the present invention that the fluorine-containing ethylenic monomer (b-1) having no functional group mentioned above is a monomer mixture of 40 to 80% by mole of tetrafluoroethylene or chlorotrifluoroethylene, 20 to 60% by mole of ethylene and 0 to 15% by mole of other monomer copolymerizable therewith.

Further the present invention relates to a resin composition for a fluorine-containing coating composition which comprises:

(A-1) 1 to 90% by weight of a fluorine-containing ethylenic polymer having functional a group and prepared by copolymerizing:

(a-5) 0.05 to 30% by mole of at least one of fluorine-containing ethylenic monomers having any one of functional groups selected from hydroxyl, carboxyl, carboxylate salt group, carboxylate ester group or epoxy and (b-5) 70 to 99.95% by mole. of at least one of fluorine-containing ethylenic monomers having no functional group mentioned above, and (B-1) 10 to 99% by weight of a fluorine-containing ethylenic polymer having no functional group in its branched chain.

In the present invention, it is preferable that the above-mentioned fluorine-containing ethylenic polymer (A-1) having a functional group is at least one of fluorine-containing ethylenic polymers having a functional group such as a copolymer comprising (a-5) at least one of fluorine-containing ethylenic monomers having functional group and represented by the formula (1):

$$CX_2=CX^1-R_f-Y \tag{1}$$

wherein Y represents $-CH_2OH$, $-COOH$, carboxylate salt group, carboxylate ester group or epoxy, X and $X^1$ are the same or different and each is hydrogen atom or fluorine atom, $R_f$ is a divalent alkylene group having 1 to 40 carbon atoms, a fluorine-containing oxyalkylene group having 1 to 40 carbon atoms, a fluorine-containing alkylene group having an ether bond and 1 to 40 carbon atoms or a fluorine-containing oxyalkylene group having an ether bond and 1 to 40 carbon atoms, and (b-5) tetrafluoroethylene, and a copolymer comprising the above-mentioned fluorine-containing monomer (a-5) having a functional group and as the component (b-5), a monomer mixture of 85 to 99.7% by mole of tetrafluoroethylene and 0.3 to 15% by mole of a monomer represented by the formula (3):

$$CF_2=CF-R_f^3 \tag{3}$$

wherein $R_f^3$ is $-CF_3$ or $OR_f^4$, in which $R_f^4$ is a perfluoroalkyl group having 1 to 5 carbon atoms, based on the total amount of the monomers except the component (a-5), and that (B-1) is at least one of polytetrafluoroethylene, tetrafluoroethylene-hexafluoropropylene copolymer or tetrafluoroethylene-perfluoro(alkyl vinyl ether) copolymer.

Further the present invention relates to the method for coating a surface of substrate with a fluorine-containing polymer, which comprises: forming, on the substrate, a layer of a primer for a fluorine-containing coating composition which comprises a fluorine-containing ethylenic polymer (A-2) having a functional group and prepared by copolymerizing (a-2) 0.05 to 30% by mole of at least one of fluorine-containing ethylenic monomers having any one of hydroxyl, carboxyl, carboxylate salt group, carboxylate ester group or epoxy and (b-2) 70 to 99.95% by mole of at least one of fluorine-containing ethylenic monomers having no functional group; forming, on the formed primer layer, a layer of a fluorine-containing ethylenic polymer (B-1) having no functional group in its branched chain; and then sintering the primer layer and the layer of the fluorine-containing ethylenic polymer having no functional group in its branched chain.

Further in the present invention, it is preferable that the above-mentioned primer (A-2) for a fluorine-containing coating composition is at least one of fluorine-containing ethylenic polymers having a functional group such as
a copolymer comprising (a-2) at least one of the fluorine-containing ethylenic monomer having a functional group and represented by the formula (1):

$$CX_2=CX^1-R_f-Y \quad (1)$$

wherein Y represents —CH$_2$OH, —COOH, carboxylate salt 5group, carboxylate ester group or epoxy, X and X$^1$ are the same or different and each is hydrogen atom or fluorine atom, R$_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms, and (b-2) tetrafluoroethylene, and
a copolymer comprising (a-2) the above-mentioned fluorine-containing monomer having a functional group and as the component (b-2), a monomer mixture of 85 to 99.7% by mole of tetrafluoroethylene and 0.3 to 15% by mole of a monomer represented by the formula (3):

$$CF_2=CF-R_f^3 \quad (3)$$

wherein R$_f^3$ is —CF$_3$ or OR$_f^4$, in which R$_f^4$ is a perfluoroalkyl group having 1 to 5 carbon atoms, based on the total amount of the monomers except the component (a-2), and that (B-2) is at least one of polytetrafluoroethylene, tetrafluoroethylene-hexafluoropropylene copolymer or tetrafluoroethylene-perfluoro(alkyl vinyl ether) copolymer.

Further it is preferable in the present invention that the surface of a substrate to be coated with the above-mentioned fluorine-containing polymer is a metal surface.

Further the present invention relates to the method for coating the surface of glass substrate with any of the above-mentioned fluorine-containing polymers.

BEST MODE FOR CARRYING OUT THE INVENTION

Figure 1:
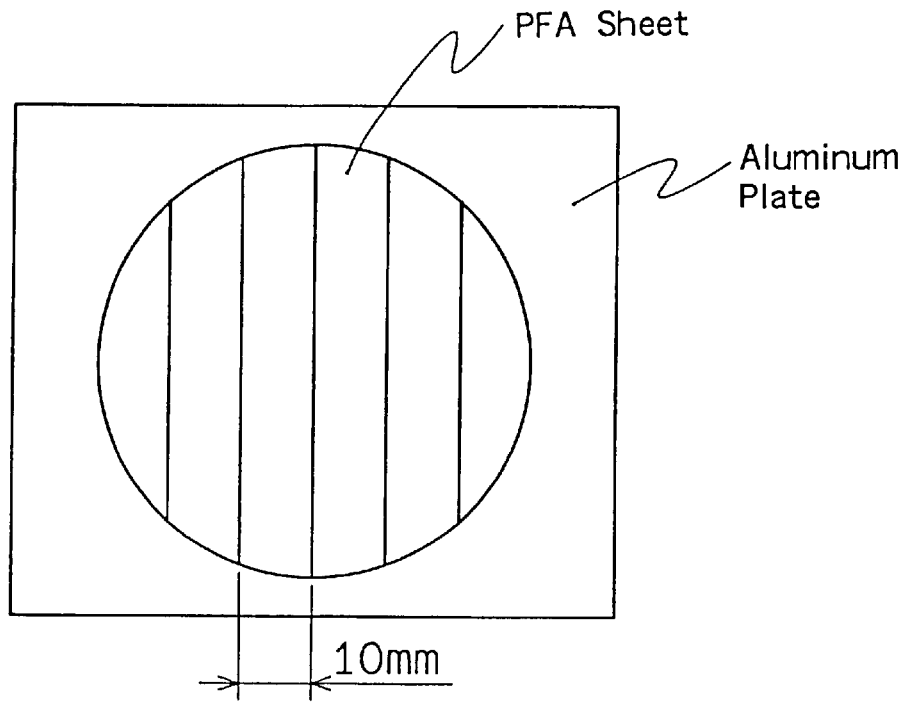
FIG. 1 is a diagrammatical plan view for explaining a coated sample made for measuring adhesive strength in the Example of the present invention.

The fluorine-containing polymer used for the material for fluorine-containing coating composition, i.e. the fluorine-containing coating material of the present invention is a fluorine-containing ethylenic polymer having a functional group and prepared by copolymerizing:

(a-1) 0.05 to 30% by mole of at least one of fluorine-containing ethylenic monomers having any one of functional groups selected from hydroxyl, carboxyl, carboxylate salt group, carboxylate ester group or epoxy, and (b-1) 70 to 99.95% by mole of at least one of fluorine-containing ethylenic monomers having no functional group mentioned above.

In the present specification, the material for coating composition includes, for example, a primer, aqueous dispersion, resin composition for coating, or powder coating composition.

The present inventors have found that the above-mentioned fluorine-containing polymer having a functional group has a surprisingly strong adhesive property to a substrate such as metal, glass or other material even without surface-treating the substrate, applying a primer layer or adding a component to enhance adhesive property of coating composition.

In the fluorine-containing the coating material of the present invention, it is important to introduce a functional group into the fluorine-containing polymer by copolymerizing the above-mentioned fluorine-containing ethylenic monomer (a-1) having a functional group with the fluorine-containing ethylenic monomer (b-1) having no functional group mentioned above. Thus the coating material can exhibit excellent adhesion directly to the surfaces of various substrates, which has been hitherto insufficient or impossible. Namely as compared with a fluorine-containing polymer having a functional group introduced by copolymerizing with a non-fluorine-containing monomer having a functional group, the fluorine-containing polymer having functional group of the present invention is excellent in thermal resistance, exhibits more inhibited thermal decomposition at processing at high temperature (for example, 200° to 400° C.), can give large adhesion force and can form a coating film being free from coloring and foaming and pin holes, leveling failure, etc. Also when a coated article is used at high temperature, the adhesion is maintained, and coating film failure such as coloring, whitening, foaming and pin holes hardly arise.

The above-mentioned fluorine-containing polymer having a functional group, which is used as the fluorine-containing coating material of the present invention, has excellent characteristics including not only thermal resistance but also chemical resistance, non-sticking property, low friction property and weather resistance which fluorine-containing polymers possess. Those excellent characteristics of the fluorine-containing polymers are given to a surface of the coating film after coating without being lowered.

The functional group of the fluorine-containing ethylenic polymer having a functional group, which is used for the fluorine-containing coating material of the present invention, is selected from hydroxyl, carboxyl, carboxylate salt group and carboxylate ester group. Adhesion to various substrates can be given by an effect of the functional group. The functional group is selected properly depending on kind, purpose and application of a surface of substrate. From the viewpoint of thermal resistance, the polymer having hydroxyl is preferable.

The fluorine-containing ethylenic polymer used for the coating material of the present invention is a fluorine-containing ethylenic polymer prepared by copolymerizing (a-1) 0.05 to 30% by mole of the fluorine-containing ethylenic monomer having functional group and represented by the formula (1):

$$CX_2=CX^1-R_f-Y \quad (1)$$

wherein X, $X^1$, $R_f$ and Y are the same as in the above-mentioned formula (1), and (b-1) 70 to 99.95% by mole of the fluorine-containing ethylenic monomer having no functional group mentioned above and being copolymerizable with the component (a-1).

Examples of the fluorine-containing ethylenic monomer (a-1) having a functional group are:
ones represented by the formula (4):

$$CF_2=CF-R_f^5-Y \quad (4)$$

wherein Y is the same as in the formula (1), $R_f^5$ is a divalent fluorine-containing alkylene group having 1 to 40 carbon atoms or $-OR_f^6$, in which $R_f^6$ is a divalent fluorine-containing alkylene group having 1 to 40 carbon atoms or a divalent fluorine-containing alkylene group having ether bond and 1 to 40 carbon atoms,
ones represented by the formula (5):

$$CF_2=CFCF_2-OR_f^7-Y \quad (5)$$

wherein Y is the same as in the formula (1), $-R_f^7$ is a divalent fluorine-containing alkylene group having 1 to 39 carbon atoms or a divalent fluorine-containing alkylene group having ether bond and 1 to 39 carbon atoms,
ones represented by the formula (2):

$$CH_2=CFCF_2-R_f^1-Y^1 \quad (2)$$

wherein $Y^1$ is the same as in the formula (1), $-R_f^1$ is a divalent fluorine-containing alkylene group having 1 to 39 carbon atoms or $-OR_f^2$, in which $R_f^2$ is a divalent fluorine-containing alkylene group having 1 to 39 carbon atoms or a divalent alkylene group having an ether bond and 1 to 39 carbon atoms, and
ones represented by the formula (6):

$$CH_2=CH-R_f^8-Y \quad (6)$$

wherein Y is the same as in the formula (1), and $R_f^8$ is a divalent fluorine-containing alkylene group having 1 to 40 carbon atoms.

The fluorine-containing ethylenic monomers having functional group and represented by the formulae (2) and (4) to (6) are preferable from the points that copolymerizability thereof with the fluorine-containing ethylenic monomer (b1) is relatively good and that thermal resistance of the polymer obtained by copolymerizing is not lowered remarkably.

Among them, from the viewpoints of copolymerizability with other fluorine-containing ethylenic monomers and thermal resistance of the obtained polymer, the compounds of the formulae (4) and (2) are preferable and the compound of the formula (2) is particularly preferable.

Examples of the fluorine-containing monomer (4) having a functional group are:

$CF_2=CFOCF_2CF_2CH_2OH$, $CF_2=CFO(CF_2)_3COOH$, $CF_2=CFOCF_2CF_2COOCH_3$, $CF_2=CFOCF_2CFOCF_2CF_2CH_2OH$ $CF_2=CFCF_2COOH$,
　　　　　　　|
　　　　　　$CF_3$ $CF_2=CFCF_2CH_2OH$, $CF_2=CFCF_2CF_2CH_2CHCH_2$
　　　　　　　　　　　　　　　　　　　　　＼ ／
　　　　　　　　　　　　　　　　　　　　　　O and the like.

Examples of the fluorine-containing monomer (5) having a functional group are:

$CF_2=CFCF_2OCF_2CF_2CF_2COOH$, $CF_2=CFCF_2OCFCFCOOCH_3$
　　　　　　　　|
　　　　　　　$CF_3$ and the like.

Examples of the fluorine-containing monomer (2) having a functional group are:

$CH_2=CFCF_2CF_2CH_2CH_2OH$, $CH_2=CFCF_2CF_2COOH$, $CH_2=CFCF_2CF_2CH_2CHCH_2$, $CH_2=CF(CF_2CF_2)_2-COOH$,
　　　　　　　　　　＼ ／
　　　　　　　　　　　O $CH_2=CFCF_2OCFCH_2OH$, $CH_2=CFCF_2OCFCOOH$,
　　　　　　　　|　　　　　　　　　　　　　　|
　　　　　　　$CF_3$　　　　　　　　　　　$CF_3$ $CH_2=CFCF_2OCFCH_2OCH_2CHCH_2$,
　　　　　　　|　　　　　　　　＼ ／
　　　　　　$CF_3$　　　　　　　　O $CH_2=CFCF_2OCFCF_2OCFCH_2OH$
　　　　　　　|　　　　|
　　　　　　$CF_3$　　$CF_3$ and the like.

Examples of the fluorine-containing monomer (6) having a functional group are:

$CH_2=CHCF_2CF_2CH_2COOH$, $CH_2=CH(CF_2)_4CH_2CH_2CH_2OH$, $CH_2=CH(CF_2)_6CH_2CH_2COOCH_3$ and the like.

Examples of the other fluorine-containing monomer are:

$CF_3$
　　　　　　　|
$CH_2=CHCH_2C-OH$
　　　　　　　|
　　　　　　　$CF_3$ and the like.

The ethylenically unsaturated monomer copolymerizable with the fluorine-containing ethylenically unsaturated monomer (a-1) having a functional group can be selected optionally from known monomers. In order to give thermal resistance, chemical resistance, non-sticking property and low friction property to copolymer, the copolymerizable ethylenic monomer is selected from fluorine-containing ethylenic monomers.

Examples of the fluorine-containing ethylenic monomer are, for instance, tetrafluoroethylene, hexafluoropropylene, chlorotrifluoroethylene, vinylidene fluoride, vinyl fluoride, perfluoro(alkyl vinyl ethers), hexafluoroisobutene,

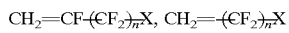

wherein both X are selected from H, Cl and F, both of n are an integer of 1 to 5, and the like.

Also in addition to (a-1) and the above-mentioned fluorine-containing ethylenic monomer, a non-fluorine-containing ethylenic monomer may be copolymerized in an amount not lowering thermal resistance and non-sticking property. In that case, it is preferable that the non-fluorine-containing ethylenic monomer is selected from ethylenic monomers having 5 or less carbon atoms in order not to lower thermal resistance. Examples thereof are ethylene, propylene, 1-butene, 2-butene and the like.

A content of functional groups in the fluorine-containing ethylenic polymer having a functional group which is used for the coating material of the present invention is from 0.05 to 30% by mole on the basis of the total amount of the monomers in the polymer. The content of functional groups is optionally selected depending on kind and shape of a substrate, and coating method, conditions, purpose and application. Preferable content is from 0.05 to 20% by mole, particularly preferably from 0.1 to 10% by mole.

When the content of the functional groups is less than 0.05%, sufficient adhesion to the surface of substrate is hardly obtained and separation of the coating film easily occurs due to temperature change and penetration of chemicals. When more than 30% by mole, thermal resistance is lowered, and at sintering at high temperature or during use at high temperature, there easily occur adhesion failure, coloring, rupture of a coating film such as foaming and pin hole, separation of coating, elution, etc.

Examples of the preferable fluorine-containing polymer used for the fluorine-containing coating material of the present invention are:

a copolymer comprising 0.05 to 30% by mole of the fluorine-containing ethylenic monomer (a-1) having a functional group and 70 to 99.95% by mole of tetrafluoroethylene (so-called polytetrafluoroethylene having a functional group (functional group-containing PTFE));

a copolymer comprising 0.05 to 30% by mole of the fluorine-containing ethylenic monomer (a-1) based on the total amount of monomers, and further 85 to 99.7% by mole of tetrafluoroethylene and 0.3 to 15% by mole of the monomer represented by the formula (3):

$$CF_2=CF-R_f^3 \quad (3)$$

wherein $R_f^3$ is selected from $-CF_3$ and $OR_f^4$, in which $R_f^4$ is a perfluoroalkyl group having 1 to 5 carbon atoms, based on the total amount of monomers except the monomer (a-1) (functional group-containing tetrafluoroethylene-perfluoro(alkyl vinyl ether) copolymer (functional group-containing PFA) or functional group-containing tetrafluoroethylene-hexafluoropropylene copolymer (functional group-containing FEP));

a copolymer comprising 0.05 to 30% by mole of the fluorine-containing ethylenic monomer (a-1) based on the total amount of monomers, and further 40 to 80% by mole of tetrafluoroethylene, 20 to 60% by mole of ethylene and 0.15% by mole of other copolymerizable monomer, based on the total amount of monomers except the monomer (a-1) (functional group-containing ethylene-tetrafluoroethylene copolymer) (functional group-containing ETFE); and the like.

Examples of the other copolymerizable monomer used for ethylene-tetrafluoroethylene (or chlorotrifluoroethylene) copolymer having hydroxyl are hexafluoropropylene, hexafluoroisobutene, $CH_2=CF-(CF_2)_n-X$, $CH_2=CH-(CF_2)_n-X$, wherein X is H, Cl or F, n is an integer of 1 to 5, perfluoro(alkyl vinyl ethers) and the like.

Those exemplified fluorine-containing ethylenic polymers are preferable in that they are excellent particulary in thermal resistance, chemical resistance, non-sticking property and low friction property among fluorine-containing polymers. While the above exemplified fluorine-containing polymers (PTFE, PFA, FEP, ETFE) having no functional group have excellent characteristics mentioned above, they are materials having the lowest adhesive property to the surface of substrate, and are suitably demanded to improve adhesive property and coating to various substrates.

The fluorine-containing polymer having a functional group which is used for the fluorine-containing coating material of the present invention can be prepared by copolymerizing the above-mentioned fluorine-containing ethylenic monomer (a-1) having a functional group and fluorine-containing ethylenic monomer (b-1) through known polymerization methods. Among them, radical polymerization method is employed mainly. Namely means for initiating the polymerization is not limited so as to initiate the polymerization radically. For example, the polymerization is initiated with an organic or inorganic radical initiator, heat, light or ionizing radiation. The polymerization can be carried out by solution polymerization, bulk polymerization, suspension polymerization, emulsion polymerization, etc. A molecular weight is regulated by concentration of the monomers to be polymerized, concentration of the initiator, concentration of a chain transfer agent and polymerization temperature. A composition of the copolymer to be produced can be controlled by kinds and amounts of monomers used.

To the fluorine-containing coating material of the present invention can be added a pigment, surfactant, viscosity control agent, levelling agent, thermal stabilizer, etc. which are usually used for coating compositions, to the extent of not lowering thermal resistance, chemical resistance and non-sticking property of the fluorine-containing resin.

The fluorine-containing ethylenic polymer having functional group which is used for the fluorine-containing coating material of the present invention can be used as a primer, by utilizing its adhesive force, for a fluorine-containing coating composition having good thermal resistance when coating a surface of metal or glass substrate with a fluorine-containing resin.

The fluorine-containing primer of the present invention comprises a fluorine-containing ethylenic polymer having functional group and prepared by copolymerizing:

(a-2) 0.05 to 30% by mole of at least one of fluorine-containing ethylenic monomers having any one of hydroxyl, carboxyl, carboxylate salt group, carboxylate ester group or epoxy and (b-2) 70 to 99.95% by mole of at least one of fluorine-containing ethylenic monomers having no functional group.

As the fluorine-containing primer of the present invention, there can be used the same ones as the fluorine-containing coating material of the present invention. The fluorine-containing primer is optionally selected depending on kind of substrate surface, kind of fluorine-containing polymer (kind of top coat) to be coated on the substrate through the primer, etc. In general preferable primer for fluorine-containing coating composition is one which has the same structure as the fluorine-containing polymer to be coated thereon and contains a functional group.

This combination exhibits good compatibility between the fluorine-containing polymer used for the primer and the fluorine-containing polymer to be coated on the primer and gives not only good adhesion between the primer and the substrate but also good intercoat adhesion between the primer layer and the top coat layer. Even in case of use at high temperature, intercoat adhesion failure, cracking, pin hole, etc. due to difference in thermal shrinkage of polymers hardly occur unlike a primer which contains other resins. Also since the whole coating film is composed of the fluorine-containing polymer, the film has transparency and vivid coloring and can be good enough for applications requiring good appearance of design. Further, excellent thermal resistance, chemical resistance, non-sticking property and low friction property can be exhibited more effectively, since the layer of fluorine-containing polymer having no functional group is formed on the outermost surface of the coating film As the primer of the present invention for fluorine-containing coating composition, there can be used the same ones as the fluorine-containing coating material of the present invention. When coating a surface of a substrate with PTFE, it is preferable to use any one selected from the coating materials of claims 9 and 10 (functional group-containing PTFE, PFA, FEP) as the primer. Particularly the use of the thermoprocessing coating material of claim 10 (functional group-containing PFA or FEP) as the primer is more preferable in that they can be adhered strongly to the surface of substrate through thermally melting by sintering. When coating a surface of substrate with PFA or FEP, it is preferable to use the coating materials of claim 10 (functional group-containing PFA or FEP) as the primer.

The fluorine-containing coating material of the present invention is capable of being in the form of an aqueous dispersion, organic solvent dispersion, powder, particle, organosol, organosol emulsion in water, etc. Among them, an aqueous dispersion or powder is preferably used from environmental and safety points of view.

The aqueous dispersion of the present invention for fluorine-containing coating composition comprises a fluorine-containing ethylenic a polymer having functional group and prepared by copolymerizing:
(a-3) 0.05 to 30% by mole of at least one of fluorine-containing ethylenic monomers having any one of functional groups selected from hydroxyl, carboxyl, carboxylate salt group, carboxylate ester group or epoxy, and
(b-3) 70 to 99.95% by mole of at least one of fluorine-containing ethylenic monomers having no functional group mentioned above. The aqueous dispersion for fluorine-containing coating composition is particularly in a state of 0.01 to 1.0 μm fine particles of the above-mentioned polymer being dispersed in water, and usually comprises a composition containing a surfactant for stabilizing the dispersion To the aqueous dispersion of the present invention can be added additives such as pigment, surfactant, defoaming agent, viscosity control agent, levelling agent, etc. which are usually used, in amounts not lowering remarkably thermal resistance, chemical resistance, non-sticking property and low friction property.

As the fluorine-containing polymer having a functional group which is used for the aqueous dispersion of the present invention, there are exemplified the same polymers as those for the above-mentioned fluorine-containing coating material.

Examples thereof are preferably aqueous dispersions of PTFE having functional group (coating material of claim 9) and PFA having functional group or FEP having functional group (coating material of claim 10).

The aqueous dispersion of the present invention can be prepared through various methods, for example,
a method wherein a powder of the fluorine-containing polymer having a functional group prepared by suspension polymerization is finely pulverized and then the pulverized powder is dispersed homogeneously into an aqueous dispersion medium with a surfactant,
a method wherein a fluorine-containing aqueous dispersion is prepared at the same time of polymerization by emulsion polymerization and then a surfactant and additives are added as the case demands, and
other methods. From the viewpoints of productivity and quality (for making particle size small and uniform), a method of preparing an aqueous dispersion directly by emulsion polymerization is preferred.

The powder coating composition of the present invention comprises a fluorine-containing ethylenic polymer having a functional group and prepared by copolymerizing:
(a-4) 0.05 to 30% by mole of at least one of fluorine-containing ethylenic monomers having any one of functional groups selected from hydroxyl, carboxyl, carboxylate salt group, carboxylate ester group or epoxy, and
(b-4) 70 to 99.95% by mole of at least one of fluorine-containing ethylenic monomers having no functional group mentioned above.

The fluorine-containing powder coating composition of the present invention is preferably being in the form of powder or granule having a particle size of 10 to 1,000 μm and an apparent density of 0.2 to 1.2 g/cc.

To the fluorine-containing powder coating composition of the present invention can be added optionally additives, for example, pigment such as carbon powder, titanium oxide or cobalt oxide; reinforcement such as glass fiber powder, carbon fiber powder or mica; amine anti-oxidant; organic sulfur compound; organotin anti-oxidant; phenolic anti-oxidant; thermal stabilizer such as metal soap; levelling agent; anti-static agent; etc., in amounts not lowering remarkably characteristics such as thermal resistance of the fluorine-containing resin.

The fluorine-containing powder coating composition of the present invention and the additives may be admixed in the form of powder (dry) or in the form of slurry (wet), and the mixing in the form of powder is preferable. As the mixing equipment, there can be used a conventional mixer or pulverizer, for example, a sand mill, V blender, ribbon blender or the like.

The fluorine-containing powder coating composition of the present invention is in general coated by electrostatic spray coating, fluidized-bed dip coating, rotolining, etc., and then sintered to give a good coating film.

In general, in case of electrostatic powder spray coating, a coating film having a thickness of 10 to 2,000 μm is formed, and in case of rotolining, a coating film having a thickness of 200 to 10,000 μm is formed.

As the fluorine-containing polymer used for the fluorine-containing powder coating composition of the present invention, there can be used preferably the same ones as the above-mentioned fluorine-containing coating material. Example of the fluorine-containing powder coating composition may be one comprising a coating material. Particularly preferable are PTFE having a functional group, PFA having a functional group, FEP having a functional group and ETFE having a functional group.

The fluorine-containing coating material of the present invention may be admixed with a fluorine-containing polymer having no functional group in its branched chain, and thus can be prepared into a resin composition for fluorine-containing coating composition. By applying the obtained composition, a coating film having good adhesion to surfaces of various substrates can be obtained.

The fluorine-containing resin composition of the present invention is a resin composition for fluorine-containing coating composition which comprises:

(A-1) 1 to 90% by weight of a fluorine-containing ethylenic polymer having a functional group and prepared by copolymerizing:

(a-5) 0.05 to 30% by mole of at least one of fluorine-containing ethylenic monomers having any one of functional groups selected from hydroxyl, carboxyl, carboxylate salt group, carboxylate ester group or epoxy and (b-5) 70 to 99.95% by mole of at least one of fluorine-containing ethylenic monomers having no functional group mentioned above, and (B-1) 10 to 99% by weight of a fluorine-containing ethylenic polymer having no functional group in its branched chain Example of the preferable fluorine-containing resin composition is a resin composition for a fluorine-containing coating composition, wherein:

the fluorine-containing ethylenic polymer (A-1) having a functional group is at least one of fluorine-containing ethylenic polymers having a functional group selected from a copolymer of (a-5) at least one of fluorine-containing ethylenic monomers having a functional group and represented by the formula (1):

$$CX_2=CX^1-R_f-Y \quad (1)$$

in which Y is —CH$_2$OH, —COOH, carboxylate salt group, carboxylate ester group or epoxy, X and X$^1$ are the same or different and each is hydrogen atom or fluorine atom, R$_f$ is a divalent alkylene group having 1 to 40 carbon atoms, a fluorine-containing oxyalkylene group having 1 to 40 carbon atoms, a fluorine-containing alkylene group having ether bond. and 1 to 40 carbon atoms or a fluorine-containing oxyalkylene group having ether bond and 1 to 40 carbon atoms and (b-5) tetrafluoroethylene, and a copolymer of (a-5) the above-mentioned fluorine-containing monomer having a functional group and (b-5) a monomer mixture of 85 to 99.7% by mole of tetrafluoroethylene and 0.3 to 15% by mole of a monomer represented by the formula (3):

$$CF_2=CF-R_f^3 \quad (3)$$

wherein R$_f^3$ is —CF$_3$ or OR$_f^4$, in which R$_f^4$ is a perfluoroalkyl group having 1 to 5 carbon atoms, and (B-1) is at least one of polytetrafluoroethylene, tetrafluoroethylene-hexafluoropropylene copolymer or tetrafluoroethylene-perfluoro(alkyl vinyl ether) copolymer.

This composition comprises a good combination of (A-1) and (B-1) which are compatible with each other, and when coated, can give not only good adhesion to the surface of substrate but also a coating film having high transparency and vivid color in compliance with applications.

Also the inherent characteristics such as thermal resistance, chemical resistance, non-sticking property and low friction property of fluorine-containing resin are easily exhibited effectively.

The resin composition for fluorine-containing coating composition of the present invention can be in the form of aqueous dispersion, organic solvent dispersion, powder, granule, organosol, aqueous organosol emulsion, etc. as mentioned above.

To the resin composition can be added pigment, surfactant, viscosity control agent, levelling agent, thermal stabilizer, etc. which are usually used for a coating composition, in amounts not lowering remarkably performance of the fluorine-containing polymer.

The present invention further relates to a method for coating a surface of a substrate with a fluorine-containing polymer, which comprises:

forming, on a surface of a substrate, a layer of a primer (A-2) for a fluorine-containing coating composition which comprises a fluorine-containing ethylenic polymer having a functional group and prepared by copolymerizing (a-2) 0.05 to 30% by mole of at least one of fluorine-containing ethylenic monomers having any one of functional groups selected from hydroxyl, carboxyl, carboxylate salt group, carboxylate ester group or epoxy, and (b-2) 70 to 99.95% by mole of at least one of fluorine-containing ethylenic monomers having no functional group mentioned above;

forming a layer of a fluorine-containing ethylenic polymer (B-1) having no functional group in its branched chain, on the formed primer layer; and sintering the primer layer and the layer of a fluorine-containing ethylenic polymer having no functional group in its branched chain.

The method for coating with the fluorine-containing polymer of the present invention comprises mainly the following three steps:

(First step) a step for applying, to a surface of a substrate, the primer for fluorine-containing coating composition of claim 2 which comprises the fluorine-containing polymer having a functional group, (Second step) a step for applying the fluorine-containing coating composition comprising the fluorine-containing polymer having no functional group, to the primer layer formed in the first step, and (Third step) a step for sintering the coated layers formed in the first and second steps.

Further the primer layer applied in the first step may be set by drying at 80° to 150° C. for about 5 minutes to about 30 minutes prior to the second step (2 coats/1 bake), and may be sintered, for example, at a temperature higher than the melting temperature thereof prior to the second step (2 coats/2 bakes).

The method for applying the primer in the first step is optionally selected depending on the form of the primer. For example, in case where the fluorine-containing primer is in the form of an aqueous dispersion, there are employed spray coating, spin coating, brush coating and dip coating methods. In case of the form of powder coating composition, there are used electrostatic coating, fluid-bed dip coating and rotolining methods.

A thickness of the primer layer may vary depending on purpose, application, kind of a surface of the substrate and coating method. The thickness is from 1 to 50 μm, preferably from 2 to 20 μm. Since the thickness of the primer is in general thin as mentioned above, it is preferable to coat the primer in the form of an aqueous dispersion by spray coating, etc.

The method for applying the coating composition comprising the fluorine-containing polymer having no functional group to the primer layer in the second step is optionally selected depending on the kind of the fluorine-containing polymer, form of the coating, purpose and application. For example, in case of an aqueous dispersion and organic solvent dispersion, in general spray coating, brush coating, roll coating and spin coating are used. In case of a powder coating composition, electrostatic coating, fluid-bed dip coating and rotolining are carried out.

A coating thickness of the fluorine-containing polymer in this step varies largely depending on purpose, application and coating method. The thickness is in general from 5 to 50 µm, preferably from about 10 µm to about 30 µm by spray coating. When a thick coating film is desired by using a powder coating composition, it is possible to apply at 20 to 2,000 µm thick by electrostatic coating and at 0.3 to 10 mm thick by rotolining.

Sintering conditions in the third step are optionally selected depending on kinds of the fluorine-containing polymers (component, melting point, etc.) of the primer layer and top layer. In general the sintering is carried out at a temperature of not less than the melting points of the both fluorine-containing polymers. Sintering time is from five minutes to three hours, preferably from about 10 minutes to about 30 minutes, though it depends on the sintering temperature. For example, when coating with PTFE, PFA and FEP, the sintering temperature is from 300° to 400° C., preferably from 320° to 400° C.

In the method for coating with the fluorine-containing polymer of the present invention, it is important to use the above-mentioned fluorine-containing polymer having a functional group as the primer. Thereby it becomes possible to coat surfaces of various substrates with the fluorine-containing polymer though adhesion therebetween has been difficult hitherto. Also particularly as the fluorine-containing polymer having a functional group which is used as the primer layer, it is preferable to have the same components as those of the fluorine-containing polymer used for the top layer, and to which a functional group is introduced.

Among the fluorine-containing polymers, for example, PTFE, PFE and FEP are most excellent in thermal resistance, chemical resistance, non-sticking property and low friction property, and coating therewith surfaces of various substrates are demanded. When coating with these fluorine-containing resins, it is preferable to use a primer comprising at least one of polymers selected from PTFE having a functional group, PFA having a functional group and FEP having a functional group.

The fluorine-containing polymer can be applied, by the above-mentioned coating method, to surfaces of various substrates, for example, metallic materials such as iron, aluminum, copper, tin, zinc, stainless steel, brass and aluminum alloy; inorganic materials such as glass, earthenware, concrete and silicon; organic materials such as fiber, paper, wood, leather, synthetic resin (particularly heat resistive resins such as polyamide and PEEK, heat resistive engineering plastics, etc.) and synthetic rubber; etc.

In the coating method of the present invention, in order to further enhance adhesion of the fluorine-containing primer to the surface of substrate, the substrate may be subjected to surface-treating by sand blasting, shot blasting, grit blasting, horning, paper scratching, wire scratching, hairline finishing, chemical treatment, plating, electrochemical treatment, chemical etching, etc.

EXAMPLE

The present invention is then explained in detail based on Reference Examples and Examples, but is not limited to them.

Reference Example 1
(Preparation of Aqueous Dispersion Comprising PFA Having Hydroxyl)

A 3-liter glass-lined autoclave equipped with a stirrer, valve, pressure gauge and thermometer was charged with 1,500 ml of pure water and 9.0 g of ammonium perfluorooctanate. After replacing with nitrogen gas sufficiently, the autoclave was evacuated and charged with 20 ml of ethane gas.

Then 3.8 g of perfluoro-(1,1,9,9-tetrahydro-2,5-bistrifluoromethyl-3,6-dioxa-8-nonenol) (formula (7)):

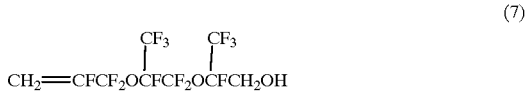

(7)

and 18 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen gas to initiate the reaction.

Since the pressure lowered with the advance of the polymerization reaction, at the time when the pressure lowered down to 7.5 kgf/cm$^2$G, it was increased again to 8.5 kgf/cm$^2$ by feeding tetrafluoroethylene gas, and the decreasing and increasing of the pressure were repeated.

With continuing supply of tetrafluoroethylene, every time when about 40 g of tetrafluoroethylene gas was consumed after starting of the polymerization, 1.9 g of the fluorine-containing ethylenic monomer having hydroxyl (compound represented by the formula (7)) was introduced under pressure three times (5.7 g in total) to continue the polymerization. When about 160 g of tetrafluoroethylene was consumed after starting of the polymerization, the supplying thereof was terminated. The autoclave was cooled and the un-reacted monomer was released to give 1,702 g of a bluish semitransparent aqueous dispersion.

A concentration of the polymer in the obtained aqueous dispersion was 10.9%, and a particle size measured by dynamic light scattering method was 70.7 nm Also a part of the obtained aqueous dispersion was sampled and subjected to freeze coagulation, and the precipitated polymer was rinsed and dried to isolate a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.7/1.2/1.1% by mole.

In infrared spectrum, characteristic absorption of —OH was observed at 3,620 to 3,400 cm$^{-1}$.

According to DSC analysis Tm was 310° C., and according to DTGA analysis 1% thermal decomposition temperature Td was 368° C. A melt flow rate measured under conditions of preheating at 372° C. for five minutes at a load of 7 kgf/cm$^2$ by using Koka-type flow tester and nozzles of 2 mmø×8 mm length was 12.0 g/10 min.

Reference Example 2
(Preparation of Aqueous Dispersion of PFA Having Hydroxyl)

The same autoclave as in Reference Example was charged with 1,500 ml of pure water and 9.0 g of ammonium perfluorooctanate. After replacing with nitrogen gas sufficiently, the autoclave was evacuated and charged with 20 ml of ethane gas.

Then 1.9 g of perfluoro-(1, 1,9,9-tetrahydro-2,5-bistrifluoromethyl-3,6-dioxa-8-nonenol) (compound of the formula (7)) and 16.1 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen gas to initiate the reaction.

Since the pressure lowered with the advance of the polymerization reaction, at the time when the pressure lowered down to 7.5. kgf/cm$^2$G, it was increased again to 8.5 kgf/cm$^2$G by feeding tetrafluoroethylene gas, and the decreasing and increasing of the pressure were repeated.

With continuing supply of tetrafluoroethylene, every time when about 40 g of tetrafluoroethylene gas was consumed after starting of the polymerization, 0.95 g of the fluorine-containing ethylenic monomer having hydroxyl (compound represented by the formula (7)) was introduced under pressure three times (2.85 g in total) to continue the polymerization. When about 160 g of tetrafluoroethylene was consumed after starting of the polymerization, the supplying thereof was terminated. The autoclave was cooled and the un-reacted monomer was released to give 1,692 g of an aqueous dispersion. A concentration of the polymer in the obtained aqueous dispersion was 10.6%, and a particle size was 76.8 nm.

Also a part of the obtained aqueous dispersion was sampled, and a white solid was isolated in the same manner as in Reference Example 1.

Analysis of the obtained white solid indicates:
TFE/PPVE/(Fluorine-containing monomer having hydroxyl and represented by the formula (7))=98.3/1.1/0.6% by mole
Tm=310° C.
1% Thermal decomposition temperature Td=374° C.
Melt flow rate: 9.5 g/10 min
In infrared spectrum, characteristic absorption of —OH was observed at 3,620 to 3,400 cm$^{-1}$.

Reference Example 3
(Synthesis of Aqueous Dispersion of PFA Having no Functional Group)

Emulsion polymerization was carried out in the same manner as in Reference Example 1 except that perfluoro-(1,1,9,9-tetrahydro-2,5-bistrifluoromethyl-3,6-dioxa-8-nonenol) (compound of the formula (7)) was not used, and 1,662 g of an aqueous dispersion of PFA having no functional group was obtained.

A concentration of the polymer in the aqueous dispersion was 9.7%, and a particle size thereof was 115 nm.

A white solid was isolated in the same manner as in Reference Example 1, and analyzed.
TFE/PPVE=98.9/1.1% by mole
Tm=310° C.
1% Thermal decomposition temperature Td=479° C.
Melt flow rate: 19.2 g/10 min
In infrared spectrum, no characteristic absorption of —OH was observed.

Reference Example 4
(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (compound of the formula (7)), 130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen gas to initiate the reaction.

Since the pressure lowered with the advance of the polymerization reaction, at the time when the pressure lowered down to 7.5 kgf/cm$^2$G, it was increased again to 8.0 kgf/cm$^2$ by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced nine times (22.5 g in total) under pressure to continue the polymerization. When about 600 g of tetrafluoroethylene was consumed after starting of the polymerization, the supplying thereof was terminated. The autoclave was cooled, and the un-reacted monomer and R-114 were released.

The obtained copolymer was washed, rinsed with methanol and then vacuum-dried to give 710 g of a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.0/2.0/1.0% by mole. In infrared spectrum, characteristic absorption of —OH was observed at 3,620 to 3,400 cm$^{-1}$. According to DSC analysis Tm was 305° C., and according to DTGA analysis 1% thermal decomposition temperature Td was 375° C. A melt flow rate measured under conditions of preheating at 372° C. for five minutes at a load of 7 kgf/cm$^2$ by using Koka-type flow tester and nozzles of 2 mmø×8 mm length was 32 g/10 min.

Reference Example 5
(Synthesis of PFA Having no Functional Group)

Synthesis was carried out in the same manner as in Reference Example 1 except that perfluoro-( 1,1,9,9-tetrahydro-2,5-bistrifluoromethyl-3,6-dioxa-8-nonenol) (compound of the formula (7)) was not used, and that 240 g of methanol was used. Thereby 597 g of PFA having no functional group was obtained.

The obtained PFA was analyzed in the same manner as in Reference Example 1.
TFE/PPVE=98.2/1.8% by mole
Tm=310° C.
Td=469° C. (1% decrease of weight)
Melt flow rate: 24 g/10 min Reference Example 6
(Preparation of Powder Coating Composition of PFA Having Hydroxyl)

The PFA powder having hydroxyl and obtained in Reference Example 4 (apparent specific gravity: 0.5, true specific gravity: 2.1, average particle size: 600 μm) was formed into a sheet of 60 mm wide×5 mm thick by compressing with Roller Compactor (model BCS-25 available from SINTO KOGIO, LTD.). Then the sheet was pulverized to about 10 mm diameter with a pulverizer, and further finely ground at 11,000 rpm at room temperature with a grinder (Cosmomizer Model N-1 available from NARA MACHINERY Co., Ltd.). Then coarse particles having a size of not less than 170 mesh (sieve opening: 88 μm) were removed with a classifier (High Bolder Model 300SD available from Shin-Tokyo Kikai Kabushiki Kaisha) to give a powder coating of PFA having hydroxyl. An apparent density of the powder was 0.7 g/ml, and an average particle size was 20 μm.

Reference Example 7

(Preparation of Powder Coating Composition of PFA Having no Functional Group)

A powder coating composition of PFA was prepared in the same manner as in Reference Example 6 except that the PFA powder (apparent specific gravity: 0.6, true specific gravity: 2.1, average particle size: 400 μm) having no functional group and obtained in Reference Example 5 was used instead of the PFA powder having hydroxyl and obtained in Reference Example 4. An apparent density of the powder was 0.73 g/ml, and an average particle size was 20 μm.

Reference Example 8

(Synthesis of Fluorine-containing Polymer by Using Non-fluorine-containing Monomer Having Functional Group)

A 1-liter stainless steel autoclave equipped with a stirrer, valve, pressure gauge and thermometer was charged with 250 g of butyl acetate, 36.4 g of vinyl pivalate (VPi), and as a non-fluorine-containing monomer having hydroxyl, 32.5 g of 4-hydroxybutyl vinyl ether (HBVE) and 4.0 g of isopropoxycarbonyl peroxide. After cooling to 0° C. with ice and replacing with nitrogen gas sufficiently, the autoclave was evacuated and charged with 47.5 g of isobutylene (IB) and 142 g of tetrafluoroethylene (TFE).

With stirring, the autoclave was heated to 40° C., reaction was carried out for 30 hours and then the reaction was terminated at the time when the inside pressure of the autoclave lowered down to lower than 2.0 kg/cm². The autoclave was cooled and the un-reacted gas monomer was released, and thereby a butyl acetate solution of a fluorine-containing copolymer was obtained. A concentration of the polymer was 45%.

A fluorine-containing copolymer was taken out from the obtained butyl acetate solution of a fluorine-containing copolymer through reprecipitation method and isolated by sufficiently drying under reduced pressure. Elementary analysis of the obtained fluorine-containing copolymer through ¹H-NMR and ¹⁹F-NMR indicated that the obtained copolymer was a copolymer of TFE/IB/VPi/HBVE=44/34/15/7% by mole.

Reference Example 9

(Synthesis of PFA Having Methyl Ester Group)

A 6-liter autoclave lined with glass and equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 2.7 g of methyl perfluoro-(9,9-dihydro-2,5-bistrifluoromethyl-3,6-dioxa-8-nonenoate) (formula 8):

(8)

130 g of perfluoro(propyl vinyl ether) (PPVE) and 220 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure became 8.0 kgf/cm²G.

Then 0.5 g of a 50% methanol solution of di-n-propyl peroxydicarbonate was fed with pressurized nitrogen gas to initiate the reaction.

Since the pressure lowered with the advance of the polymerization reaction, at the time when the pressure lowered down to 7.5 kgf/cm²G, it was increased again to 8.0 kgf/cm² by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.7 g of the fluorine-containing ethylenic monomer having hydroxyl (compound represented by the formula (8)) was introduced nine times (24.3 g in total) under pressure to continue the polymerization. When about 600 g of tetrafluoroethylene was consumed after starting of the polymerization, supplying thereof was terminated. The autoclave was cooled, and the un-reacted monomer and R-114 were released.

After washed and rinsed with methanol, the obtained copolymer was vacuum-dried to give 710 g of a white solid. Components and their amounts of the obtained copolymer which were determined through ¹⁹F-NMR and IR analyses were TFE/PPVE/(Fluorine-containing ethylenic monomer having methyl ester group and represented by the formula (8))=97.8/1.0/1.2% by mole. In infrared spectrum, characteristic absorption of —COOMe was observed at 1,795 cm⁻¹. According to DSC analysis Tm was 308° C., and according to DTGA analysis 1% thermal decomposition temperature Td was 376° C. A melt flow rate measured under conditions of preheating at 372° C. for five minutes at a load of 7 kgf/cm² by using Koka-type flow tester and nozzles of 2 mmø×8 mm length was 29 g/10 min.

Reference Example 10

(Synthesis of PFA Having Carboxyl)

10 Grams of the white powder of PFA having a methyl ester group and obtained in Reference Example 9 was added to a mixed solvent comprising 600 ml of methanol and 200 ml of water, in which 40 g of NaOH was dissolved, followed by stirring at 70° to 75° C. for five hours.

After cooling, a 2N-HCl was added until pH of the solution became 2, followed by stirring for three hours.

A white powder was taken out, washed, rinsed with methanol and dried at 100° C.

Through IR analysis, an absorption of carbonyl of carboxyl group and an absorption of OH group were newly observed at 1,700 cm⁻¹ and 3,200 to 3,700 cm⁻¹, respectively. According to DSC analysis Tm was 308° C., and according to DTGA analysis 1% thermal decomposition temperature was 335° C.

Reference Example 11
(Preparation of Powder Coating Composition of PFA Having Methyl Ester Group)

A powder coating composition having methyl ester group (apparent density; 0.71 g/l, average particle size: 20 μm) was prepared in the same manner as in Reference Example 6 except that the PFA powder having methyl ester group and obtained in Reference Example 9 (apparent specific gravity: 0.5, true specific gravity: 2.1, average particle size: 650 μm) was used instead of the PFA powder having hydroxyl and obtained in Reference Example 4.

Reference Example 12
(Preparation of Powder Coating Composition of PFA Having Carboxyl)

A powder coating composition having carboxyl (apparent density: 0.73 g/l, average particle size: 22 μm) was prepared in the same manner as in Reference Example 6 except that the PFA powder having carboxyl and obtained in Reference Example 10 (apparent specific gravity: 0.52, true specific gravity: 2.1, average particle size: 670 μm) was used instead of the PFA powder having hydroxyl and obtained in Reference Example 4.

Example 1
(1) Pretreatment of Substrate

A 1.5 mm thick pure aluminum plate (A1050P) and 1.5 mm thick SUS304 were degreased with acetone, respectively.

(2) Formation of Primer of Fluorine-containing Polymer Having Functional Group

The aqueous dispersion comprising the PFA having hydroxyl and prepared in Reference Examples 1 and 2 was applied with an air spray gun so that a coating thickness became about 5 μm, followed by infrared drying at 90° C. for ten minutes and sintering at 380° C. for 20 minutes.

(3) Formation of Layer (Top Layer) of Fluorine-containing Polymer Having no Functional Group On the primer layer obtained in above (2) was coated with an aqueous coating composition of PTFE (POLYFLON TFE ENAMEL EK4300CRN available from Daikin Industries, Ltd.) as a coating composition comprising a fluorine-containing polymer having no functional group, by using an air sprayer so that a coating thickness became about 20 μm, followed by infrared drying at 90° C. for ten minutes and sintering at 380° C. for 20 minutes.

(4) Evaluation of Adhesion

A method for determining adhesion is mentioned below.
(Cross-cut Adhesion Test)

According to JIS K 5400 1990, 8.5.2, a coated surface is cross-cut to give 100 squares, an adhesive tape (available from Nichiban Kabushiki Kaisha) is adhered to the cross-cut surface tightly, and the tape is torn off. This is repeated ten times with new tapes to check to see how many squares remain among 100 squares. The results are shown in Table 1.

Example 2

A coated plate was produced in the same manner as in Example 1 except that a primer was formed by using the aqueous dispersion of PFA having hydroxyl and obtained in Reference Example 2 as a fluorine-containing polymer having functional group, and adhesion of the coating film was evaluated in the same manner as in Example 1. The results are shown in Table 1.

Comparative Example 1

A coated plate was produced in the same manner as in Example 1 except that a primer of the aqueous dispersion of PFA having no functional group and obtained in Reference Example 3 was used instead of the primer comprising the fluorine-containing polymer having functional group, and adhesion of the coating film was evaluated in the same manner as in Example 1. The results are shown in Table 1.

Examples 3 and 4 and Comparative Example 2

Coated plates of Example 3, Example 4 and Comparative Example 2 were produced in the same manner as in Example 1, Example 2 and Comparative Example 1, respectively except that a top layer was formed by using an aqueous coating of FEP (NEOFLON FEP Dispersion ND-1 available from Daikin Industries, Ltd.) as a coating composition comprising a fluorine-containing polymer having no functional group, and adhesion of the coating films were evaluated, respectively. The results are shown in Table 1.

Example 5
(1) Pretreatment of Substrate

A substrate was pretreated in the same manner as in Example 1.

(2) Formation of Primer Layer of Fluorine-containing Polymer Having Functional Group The aqueous dispersion comprising PFA having hydroxyl and prepared in Reference Example 1 was applied with an air spray gun so that a coating thickness became about 5 μm, followed by infrared drying at 90° C. for ten minutes.

(3) Formation of Layer (Top Layer) of Fluorine-containing Polymer Having no Functional Group On the primer layer obtained in above (2) was coated with a powder coating composition of PFA (NEOFLON PFA Powder Coating Composition ACX-3 available from Daikin Industries, Ltd.) as a coating comprising a fluorine-containing polymer having no functional group, through electrostatic coating so that a coating thickness became about 40 μm, followed by sintering at 380° C. for 20 minutes.

(4) Evaluation of Adhesion

Adhesion was determined in the same manner as in Example 1.

The results are shown in Table 1.

Example 6

A coated plate was produced in the same manner as in Example 5 except that a primer of the aqueous dispersion of PFA having hydroxyl and obtained in Reference Example 2 was used as a primer comprising a fluorine-containing polymer having functional group, and adhesion of the coating film was evaluated in the same manner as in Example 5. The results are shown in Table 1.

Comparative Example 3

A coated plate was produced in the same manner as in Example 5 except that a primer of the aqueous dispersion of PFA having no functional group and obtained in Reference Example 3 was used instead of the primer comprising the fluorine-containing polymer having functional group, and adhesion of the coating film was evaluated in the same manner as in Example 5. The results are shown in Table 1.

Example 7
(Evaluation of Adhesion of PFA Powder Coating Composition Having Hydroxyl)
(1) Production of Press Sheet for Adhesion Test About 4 g of the PFA powder coating composition having hydroxyl and prepared in Reference Example 6 was charged in a cylindrical die mold having a diameter of 60 mm, and compression-molded by using a press machine at room temperature at a pressure of 300 kgf/cm$^2$ to give a disc-like cold press sheet.

(2) Pretreatment of Substrate

A 100×100×1 (mm) pure aluminum plate was sand-blasted after degreased with acetone. (3) Production of adhered sample The press sheet for test which was obtained in above (1) was placed on the aluminum plate (above (2)), and put in a hot air dryer, heated and melted at 330° C. for ten minutes. Thus a sample in which about 450 μm thick sheet was adhered to the aluminum plate was obtained.

(4) Measurement of Adhesive Strength

Figure 2:
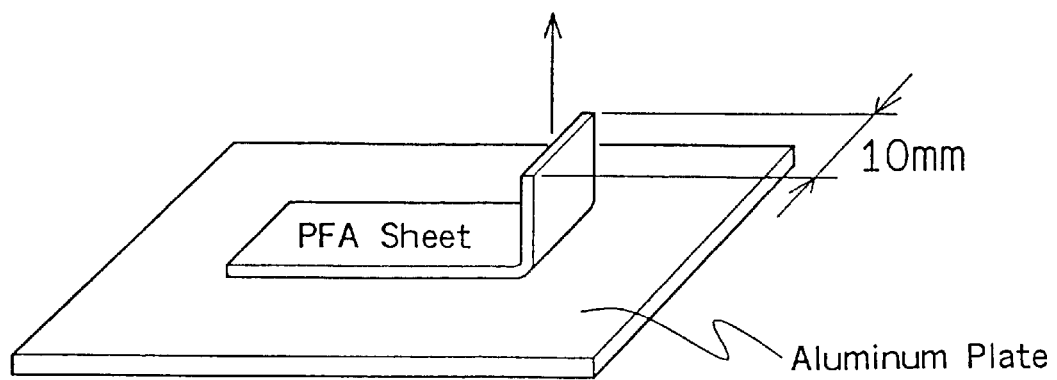
FIG. 2 is a diagrammatical perspective view of a measuring equipment used for measuring adhesive strength in the Example of the present invention.

As shown in FIG. 1, the adhered sheet of the sample was cut at an interval of 10 m with a cutter. One end of each strip-like sheet was turned over and pulled up at an angle of 90° to the aluminum plate as shown in FIG. 2 to measure peel strength at room temperature at a cross-head speed of 50 mm/min by using Tensilon Universal Tester (available from Orientec Corporation). An adhesive strength was 5.5 kgf/cm which was an average peeling load by area method.

Comparative Example 4
(Evaluation of Adhesion of PFA Powder Coating Composition Having no Functional Group)

Production of a press sheet for an adhesion test, pretreatment of a substrate and production of an adhered sample were carried out in the same manner as in Example 7 except that the PFA powder coating composition having no functional group and prepared in Reference Example 7 was used instead of the PFA powder coating composition having hydroxyl and prepared in Reference Example 6, to measure adhesive strength.

Adhesive strength of the PFA powder coating composition having no functional group was 0.8 kgf/cm.

Example 8
(Electrostatic Coating of PFA Powder Coating Composition Having Hydroxyl)

The PFA powder coating composition having hydroxyl and prepared in Reference Example 6 was subjected to electrostatic coating at room temperature at an applied voltage of 40 kV on the aluminum plate pretreated in the same manner as in Example 7 by using an electrostatic coating machine (Model GX3300 available from Iwata Toso Kabushiki Kaisha). The coated plate was sintered at 330° C. for 15 minutes in a hot air dryer to give a coating film.

The coating film was a transparent, uniform, continuous film and adhered to the aluminum plate strongly.

Comparative Example 5
(Thermal Resistance of Fluorine-containing Polymer Prepared by Using Non-fluorine-containing Monomer Having Functional Group)

A thermal decomposition temperature of the fluorine-containing copolymer obtained in Reference Example 8 was measured through TGA analysis, and 1% thermal decomposition temperature thereof was 220° C. It was recognized that the fluorine-containing copolymer prepared by using a non-fluorine-containing monomer having functional group as in Reference Example 8 has low thermal resistance.

Further the fluorine-containing copolymer prepared in Reference Example 8 was dissolved in butyl acetate in a concentration of 10% by weight.

Then pretreatment of a pure aluminum substrate, coating of a primer layer of the fluorine-containing polymer of Reference Example 8 and coating of a top layer (electrostatic coating of a PFA powder coating composition) were carried out in the same manner as in Example 5 except that the butyl acetate solution containing the fluorine-containing polymer of Reference Example 8 was used instead of the aqueous dispersion of PFA having hydroxyl which was used for the primer layer.

The coating film obtained by sintering at 380° C. for 20 minutes was colored brown and foamed, and also separation was seen. Thus uniform transparent coating film could not be obtained.

TABLE 1

|  | Ex. 1 | Ex. 2 | Com. Ex. 1 | Ex. 3 | Ex. 4 | Com. Ex. 2 | Ex. 5 | Ex. 6 | Com. Ex. 3 |
|---|---|---|---|---|---|---|---|---|---|
| Fluorine-containing aqueous dispersion used for primer layer | Ref. Ex. 1 | Ref. Ex. 2 | Ref. Ex. 3 | Ref. Ex. 1 | Ref. Ex. 2 | Ref. Ex. 3 | Ref. Ex. 1 | Ref. Ex. 2 | Ref. Ex. 3 |
| Fluorine-containing resin forming top layer | PTFE | PTFE | PTFE | FEP | FEP | FEP | PFA | PFA | PFA |
| Evaluation of adhesion (Cross-cut adhesion test) |  |  |  |  |  |  |  |  |  |
| SUS304 | 100/100 | 100/100 | 0/100 | 100/100 | 100/100 | 0/100 | 100/100 | 100/100 | 20/100 |
| Pure aluminum | 100/100 | 100/100 | 0/100 | 100/100 | 100/100 | 20/100 | 100/100 | 100/100 | 30/100 |

Industrial Applicability

According to the fluorine-containing coating material and the coating method of the present invention, coated articles having excellent adhesion can be obtained for surfaces of various substrates having various shapes. Also excellent thermal resistance, chemical resistance, non-sticking property, low friction property, and electrical and optical properties of the fluorine-containing polymer can be given to the substrates, thus making it possible to be available for various applications.

By applying the fluorine-containing coating material of the present invention through the coating method of the present invention, corrosion resistance, rust preventing property, chemical resistance, weather resistance, non-sticking property and sliding property can be given to metal surfaces, for example, aluminum, iron, alloys, etc., thus making it possible to be available for various applications such as building material, chemical plant, food processing, cooking apparatus, car-related parts, OA-related parts, etc.

For surfaces of copper and copper-containing metals, excellent electrical properties of a fluorine-containing resin (particularly high frequency electric insulation) can be given, thus enabling applications in the electrical and electronic fields such as printed circuit boards and electrical and electronic parts for high frequency.

For surfaces of glass materials, water-repelling property, oil-repelling property, anti-reflection property and low refraction can be given without losing transparency, which makes it possible to use the coated glass materials for optical parts, liquid crystal-related parts, glass for building and glass for cars. Also a function to prevent glasses from broken can be exhibited, which makes it possible to use the coated glass for instruments for illumination and explosion-proof glass for building.

What is claimed is:

1. A method for coating a surface of a substrate with a fluorine-containing polymer, which comprises:
   forming, on a surface of the substrate, a layer of a primer (A-2) for fluorine-containing coating composition which comprises a fluorine-containing ethylenic polymer having functional group and prepared by copolymerizing
      (a-2) 0.05 to 30% by mole of at least one of fluorine-containing ethylenic monomers having any one of functional groups selected from the group consisting of hydroxyl, carboxyl, carboxylate salt group, carboxylate ester group and epoxy and
      (b-2) 70 to 99.95% by mole of at least one of fluorine-containing ethylenic monomers having no functional group;
   forming, on the so-formed primer layer, a layer of a fluorine- containing ethylenic polymer (B-2) having no functional group in its branched chain; and
   sintering the primer layer and the layer of the fluorine-containing ethylenic polymer having no functional group in a branched chain.

2. The method for coating a surface of a substrate with a fluorine-containing polymer of claim 1, wherein the primer (A-2) for fluorine-containing coating composition is at least one of the fluorine containing ethylenic polymers having a functional group selected from the group consisting of:
   (1) a copolymer of:
      (a-2) at least one of the fluorine-containing ethylenic monomers having a functional group and represented by the formula (1):

(wherein Y is -CH2OH, -COOH, carboxylate salt group, carboxylate ester group or epoxy, X and X1 are the same or different and each is hydrogen atom or fluorine atom, Rf is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms) and
      (b-2) tetrafluoroethylene; and
   (2) a copolymer of:
      (a-2) the above-mentioned fluorine-containing ethylenic monomer having a functional group, and
      (b-2) a monomer mixture of 85 to 99.7% by mole of tetrafluoroethylene and 0.3 to 15% by mole of a monomer represented by the formula (3):

(wherein Rf3 is -CF3 or ORf4, in which Rf4 is a perfluoroalkyl group having 1 to 5 carbon atoms), said % by mole being based on the total amount of the monomers excepting (a-2); and wherein
   the fluorine-containing ethylenic polymer (B-2) is at least one of polytetrafluoroethylene, tetrafluoroethylene-hexafluoropropylene copolymer or tetrafluoroethylene-perfluoro(alkyl vinyl ether) copolymer.

3. The method for coating a surface of substrate with a fluorine-containing polymer of claim 1, wherein the substrate surface to be coated with the fluroine-containing polymer is a metal surface.

4. The method for coating a surface of substrate with a fluorine-containing polymer of claim 1, wherein the substrate surface to be coated with the fluorine-containing polymer is a surface of glass material.

5. A method for coating a surface of a substrate with a fluorine-containing polymer, which comprises:
   forming, on a substrate, a layer of a fluorine-containing coating composition which comprises a fluorine-containing ethylenic polymer having functional group and prepared by copolymerizing the following fluorine-containing ethylenic monomers (a-1) and (b-1):
   (a-1) 0.05 to 30% by mole of at least one of fluorine-containing ethylenic monomers having any one of functional groups selected from the group consisting of carboxyl, carboxylate salt group, carboxylate ester group and epoxy and;
   (b-1) 70 to 99.95% by mole of at least one of the fluorine-containing ethylenic monomers which do not have the functional group mentioned above and which is selected from the group consisting of tetrafluoroethylene, chlorotrifluoroethylene, vinylidene fluoride, perfluoro(alkyl vinyl ether), hexafluoroisobutene, $CH_2=CF-(CF_2)_n-X$ and $CH_2=CH_2-(CF_2)_n-X$, wherein both X are independently selected from H, Cl and F and both of n are independently an integer of 1 to 5.

6. The method of claim 5, wherein the fluorine-containing ethylenic monomer (b-1) having no functional group is tetrafluoroethylene.

7. The method of claim 5, wherein the fluorine-containing ethylenic monomer (b-1) having no functional group is a monomer mixture of 85 to 99.7% by mole of tetrafluoroethylene and 0.3 to 15% by mole of a monomer represented by the formula (3):

wherein $R_f^3$ is $OR_f^4$, in which $R_f^4$ is a perfluoroalkyl group having 1 to 5 carbon atoms.

8. A material for fluorine-containing coating composition which comprises a fluorine-containing polymer having functional group and prepared by copolymerizing the following fluorine-containing ethylenic monomers (a-1) and (b-1):
   (a-1) 0.05 to 30% by mole of at least one of fluorine-containing ethylenic monomers having any one of functional groups selected from the group consisting of carboxyl, carboxylate salt group, carboxylate ester group and epoxy and;

(b-1) 70 to 99.95% by mole of at least one of the fluorine-containing ethylenic monomers which do not have the functional group mentioned above and which is selected from the group consisting of tetrafluoroethylene, chlorotrifluoroethylene, vinylidene fluoride, perfluoro(alkyl vinyl ether), hexafluoroisobutene, $CH_2=CF-(CF_2)_n-X$ and $CH_2=CH_2-(CF_2)_n-X$, wherein both X are independently selected from H, Cl and F and both of n are independently an integer of 1 to 5, and wherein the material is one of materials selected from the group consisting of a material which is in the form of a solution in a solvent and is used for fluorine-containing coating composition, a material which is in the form of dispersion in water and is used for an aqueous dispersion for fluorine-containing coating composition and a material which is in the form of a powder and is used for a fluorine-containing powder coating composition.

* * * * *

UNITED STATES PATENT AND TRADEMARK OFFICE
CERTIFICATE OF CORRECTION

PATENT NO. : 6,645,555 B1
DATED : November 11, 2003
INVENTOR(S) : Takayuki Araki et al.

It is certified that error appears in the above-identified patent and that said Letters Patent is hereby corrected as shown below:

Column 26,
Lines 39 to 40, "$CH_2=CH_2-(CF_2)_n-X$" should be -- $CH_2=CH-(CF_2)_n-X$ --

Column 27,
Line 7 to 8, "$CH_2=CH_2-(CF_2)_n-X$" should be -- $CH_2=CH-(CF_2)_n-X$ --.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,555 B1
DATED : November 11, 2003
INVENTOR(S) : Takayuki Araki et al.

It is certified that error appears in the above-identified patent and that said Letters Patent is hereby corrected as shown below:

Title page,
Item [62], Related U.S. Application Data, "Division of application No. 09/077,939, filed on Jun. 5, 1995, now Pat. No. 6,069,215." should be -- Division of application No. 09/077,939, filed as application No. PCT/JP96/03575 on December 5, 1996, now Pat. No. 6,069,215. --

Signed and Sealed this

Fourth Day of May, 2004

JON W. DUDAS
*Acting Director of the United States Patent and Trademark Office*